United States Patent [19]

Hutchison et al.

[11] Patent Number: 5,327,534
[45] Date of Patent: Jul. 5, 1994

[54] DETECTION OF DUPLICATE ALIAS ADDRESSES

[75] Inventors: Jerry D. Hutchison, Littleton; Henry S. Yang, Andover, both of Mass.

[73] Assignee: Digital Equipment Corporation, Maynard, Mass.

[21] Appl. No.: 559,031

[22] Filed: Jul. 30, 1990

[51] Int. Cl.$^5$ .............................................. G06F 12/00
[52] U.S. Cl. ................................. 395/200; 364/259.1; 364/253; 364/927.96; 364/253.3; 364/DIG. 1; 395/400; 340/825.52; 370/94.1
[58] Field of Search ....................... 395/400, 425, 200; 370/94.1; 340/825.52

[56] References Cited

U.S. PATENT DOCUMENTS

| | | | |
|---|---|---|---|
| 4,506,360 | 3/1985 | Kryskow | 370/85 |
| 4,718,005 | 1/1988 | Feigenbaum | 395/200 |
| 4,747,100 | 5/1988 | Roach | 370/85.5 |
| 4,805,093 | 2/1989 | Ward | 395/425 |
| 4,825,204 | 4/1989 | Nakamura | 340/825.52 |
| 4,881,074 | 11/1989 | Reichbauer et al. | 340/825.05 |
| 4,937,817 | 6/1990 | Lin | 370/94.1 |
| 4,984,233 | 1/1991 | Nakayashiki | 370/16 |
| 5,119,290 | 6/1992 | Loo | 395/400 |
| 5,142,530 | 8/1992 | Geyer | 370/85.5 |

FOREIGN PATENT DOCUMENTS 290934 11/1988 European Pat. Off. .
63-303537 12/1988 Japan .

OTHER PUBLICATIONS

European Search Report dated Oct. 30, 1991, for European Application No. 91 30 6585.0.
Ocheltree, Kenneth B., Jan. 23 1989, "FDDI Duplicate Address Problems", International Business Machines, IBM, Research Report.
Ocheltree, Kenneth B., and Montalvo, Rafael M., Oct. 1989, IEEE 14th Conference on Local Computer Networks, in Minneapolis, Minn., "FDDI Ring Management".
Yang, H. and Ramakrishnan, K. K., "Frame Content Independent Stripping for Token Ring", Proceedings of the ACM, SIGCOM 1990, Sep. 1990.
FDDI SMT-"Fiber Distributed Data Interface (FDDI)-Station Management", Sep. 5, 1989, Draft Proposed American National Standard, X3T9/89-, X3T9.5/84-49, Rev. 5.1, published by American National Standards Institute.

(List continued on next page.)

*Primary Examiner*—Eric Coleman
*Attorney, Agent, or Firm*—Albert P. Cefalo; A. Sidney Johnston; James F. Thompson

[57] ABSTRACT

A duplicate address condition in a computer network may be detected by a station of the type for attachment to a computer communications network, the network capable of maintaining communications among a plurality of stations, the station having means for receiving a frame, the frame having a source address field and a frame control field; means for maintaining an individual address of the station; means for maintaining a source address list of address, the source address list not containing the individual address; means for determining that a contents of the source address field in the frame matches at least one address in the source address list; means for determining that the frame control field of the frame has a predetermined contents; and, means, responsive to the source address of the frame matching at least one address in the source address list and the frame control field of the frame having the predetermined value, for setting an indicator that a duplicate address condition exists. The predetermined contents of the frame control field further comprises an indication that the frame is a predetermined type of control frame. The predetermined type of claim may be a beacon frame, a claim frame, or some other MAC protocol frame. The list of alias addresses may be stored in a content addressable memory. A cyclical redundancy check may be used for determining that bits from the source address field and bits from the frame control field are error free.

16 Claims, 6 Drawing Sheets

OTHER PUBLICATIONS

FDDI SMT–"Fiber Distributed Data Interface (FDDI)–Station Management", May 18, 1990, Preliminary Draft Proposed American National Standard, X3T9/90-078, X3T9.5/84-49, Rev. 6.2.

FDDI MAC–"fiber distributed data interface (FDDI)–token ring media access control (MAC)", American National Standard 1987, published by American National Standards Institute, X3.139-1987.

Advanced Micro Devices, Feb. 1989, Specification sheet for chip Am79C83, Title: "Fiber Optic Ring Media Access Controller (FORMAC)" Publication No. 09731.

FDDI PHY–"fiber distributed data interface (FDDI)–token ring physical layer protocol (PHY)", American National Standard, 1988, Published by American National Standards Institute, ANSI X3.148-1988.

J. Winkler, et al.: "Standards and Architecture for Token-Ring Local Area Networks", 1986 Fall Joint Computer Conference, Nov. 1986, Dallas, U.S., pp. 479–488.

Data Communications. vol. 18, No. 15, Nov. 1989, New York, USA, pp. 26–34, "Token ring compatibility: It's time to plug and play" Authors: Jim Carlo and John Hughes.

Computer Networks and ISDN Systems. vol. 11, No. 2, Feb. 1986, Amsterdam, Netherlands, pp. 121–131. "Reliability Mechanisms of the FDDI High Bandwidth Token Ring Protocol" Author: M. J. Johnson.

European Search Report dated Oct. 30, 1991, for European Application No. 91 30 6902.7.

DETECTION OF DUPLICATE ALIAS ADDRESSES

FIELD OF THE INVENTION

This invention relates generally to token controlled computer networks for communication among a plurality of computers, and more particularly to fault sequences related to duplicate station addresses on the network.

BACKGROUND OF THE INVENTION

Stations make use of a unique station address, referred to as "my address" to identify the station. (Quote marks are used herein to set off compound nouns when their use helps to clarify the meaning of a sentence, as in "my address". Also quote marks are used to set off other words when their use helps to clarify the meaning of the sentence.) Stations also maintain a list of address which may contain my address for the purpose of comparing an address in the destination address field of a frame detected on the network. In the event that a station finds a match between the destination address of a frame and an address in the list of addresses, the station takes predetermined actions.

Also in most token controlled networks, the station transmitting a frame onto the network is required to remove, or "strip", the frame from the network after the frame circumnavigates the network and returns to the originating station. In some networks, stripping is accomplished by a station detecting a frame on the network, comparing the source address SA of the frame with the my address of the station, and stripping the frame in the event that the SA matches the my address. This form of stripping is called "source address stripping".

As the result of a fault, a station may transmit a frame onto the ring where the source address SA field of the frame is the same as the my address of another station of the network. For example, a software or hardware fault in a station may cause the fault. Or, for a further example, a human error in entering a station address may have resulted in a duplicate address on the network. The fault of having a duplicate station address on a single local area network is referred to as the "duplicate address problem".

In some cases the duplicate address fault may have little or no effect on the network, where in other situations the fault condition may destroy the operability of the network.

A ring network may have two states, a "ring operating state", and a "ring not operating state". When the ring is in the "ring not operating state", the ring may be in recovery and initialization process. A typical token ring protocol may use Beacon, Claim, or other MAC (Medium Access Control), frames for recovery and initialization.

In the event that two stations have the same my addresses, or the event that one station has a list of address and the list contains an address the same as the "my address" of another station on the network, then when the network is in the "ring not operating state" the network may fail to become operational. Alternatively, after the ring has been in the "ring operating" state, the ring may cease to operate after a period of successful operation.

More details of network failure modes resulting from duplicate address situations are discussed in the APPENDIX herebelow. Also details of the Fiber Distributed Data Interface, FDDI, ring network along with duplicate address failure modes are discussed in the APPENDIX.

Also discussed in the Appendix is the ANSI/FDDI Ring Management protocols, referred to as RMT. RMT may detect duplicate "my addresses" on a communications ring. RMT requires executing complex logic in order to accomplish detection of duplicate "my addresses". Accordingly, RMT is too time consuming to execute in the event that a source address in a frame is compared with a list of addresses in the station. The difficulty level, such as the time required to operate RMT for a source address in a frame with a list of addresses, or to implement the logic for RMT for a list into a silicon chip, increases approximately proportionally to the number of addresses in the list. For a list of reasonable length the time to execute the RMT logic may be too long for ordinary operation of the station.

The detection of duplicate addresses during ring recovery and initialization has not been satisfactorily solved, and so rings may enter a series of oscillations and fail to become operational.

SUMMARY OF THE INVENTION

A station of the type for attachment to a communications network, the network capable of maintaining communications among a plurality of stations, comprises, means for receiving a frame by the station, the frame having a source address field and a frame control field; means for maintaining a selected individual address of the station; means for maintaining a source address list of address, the source address list not containing the selected individual address; means for determining that a contents of the source address field in the frame matches at least one address in the source address list; means for determining that the frame control field of the frame has a predetermined contents; and, means, responsive to the source address of the frame matching at least one address in the source address list and the frame control field of the frame having the predetermined value, for setting an indicator that a duplicate address condition exists.

The predetermined contents of the frame control field further comprises an indication that the frame is a predetermined type of control frame. The predetermined type of claim may be a beacon frame, a claim frame, or some other MAC protocol frame.

The list of alias addresses may be stored in a content addressable memory.

A cyclical redundancy check may be used for determining that bits from the source address field and bits from the frame control field are error free.

Further, the apparatus may have a means for setting a first signal to a first predetermined value in the event that the contents of the source address field of the frame match a source address in the source address list; a means for setting a second signal to a second predetermined value in the event that the contents of the frame control field has the predetermined contents; a means for setting a third signal to a third predetermined value in the event that the source address field and the frame control field pass the cyclical redundancy check; and a means, responsive to the first signal being at the first predetermined value and the second signal being at the second predetermined value and the third signal being at the third predetermined value, for indicating that a duplicate address condition exists.

BRIEF DESCRIPTION OF THE DRAWINGS

Turning now to the drawings, in which like numerals represent like parts in the several views.

DETAILED DESCRIPTION

Figure 1:
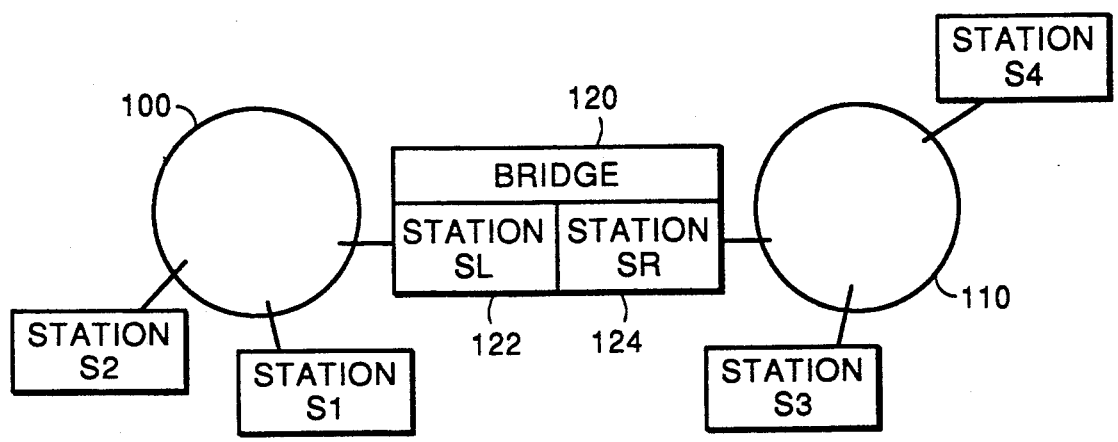
FIG. 1 shows schematically the connection of two local area networks by a bridge.

Referring now to FIG. 1, FDDI ring communications system 100 and FDDI ring communications system 120 are connected together for exchange of data frames by bridge 120. Stations S1, S2, and SL are connected into ring 100, and stations S3, S4, and SR are connected into ring 110. Station SL is the station of bridge 120 connected into ring 100, and station SR is the station of bridge 120 connected into ring 110.

Each station has an individual address, referred to as "my address", MA. The "my address" of a station should be unique. The station uses its "my address" for identification purposes such as sending information frames, receiving information frames, and ring initialization frame. The station may, in addition, use other addresses for sending information frames or receiving information frames. For ring initialization the station always uses only its "my address".

The individual address of a station should be unique. The problem disclosed and solved by the present invention arises when more than one station has the same individual address, the duplicate address problem.

For example, the individual address, MA, of each station corresponds to the notation of the FDDI specification referred to hereinbelow in the Appendix as "my long address", MLA. In a ring operating in accordance with the FDDI specification, each station inserts an individual address into a frame as the source address SA of the frame before transmitting the frame onto the ring. For example, the station may insert its individual "my long address" into the source address field of the frame. As a further example, the station may contain a list of other station's "my addresses" and may insert an address from the list into the source address field of the frame.

For example, an individual address may be identified by having a zero as the first bit. The individual address is to be contrasted with a group address where a group address may have a 1 as the first bit.

The use of the term "station" in the present context assigns to the station one individual address which should be unique. Those skilled in the art of computer networks use the term "station" in some contexts to include an apparatus having more than one Medium Access Control entity (MAC entity), and one individual address, which should be unique, is assigned to each MAC entity. In this context the station may have several MAC entities, and each MAC entity has its own individual address. Those skilled in the art of computer networks will recognize that the present terminology wherein a station has only one MAC entity and one individual address, which should be unique, is equivalent to the alternative wherein a station may have several MAC entities each with its own individual address, and the equivalence is crystallized by referring then to each MAC entity as a "station".

There are applications that may require the use of addresses which are different from the station's individual address. An "alias address" is an address different from the station's individual address but used in a similar manner as the individual address. For example, an application may require that an alias address be used as a source address when transmitting frames. Also the "alias address" may be used to compare with the destination address field of a frame when receiving frames.

Figure 2:
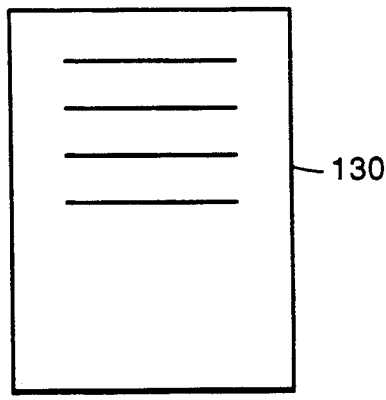
FIG. 2 shows a source address list, SA list, in accordance with the invention.
Figure 3:
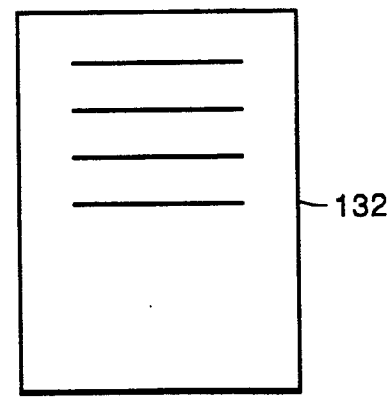
FIG. 3 shows a destination address list, DA list, in accordance with the invention.

Referring now to FIG. 2 and FIG. 3, each station may have one or more alias addresses. The alias addresses are arranged into a source address list, SA list 130 as shown in FIG. 2, and into a destination address list, DA list 132 as shown in FIG. 3. The SA list 130 does not contain the station "individual address". In contrast, the DA list 132 usually contains the station individual address.

For functions requiring a source address, a station uses its SA list 130, and also separately uses its individual address. And the station uses its DA list 132 for functions requiring a destination address.

The SA list 130 has at least two purposes, the first purpose being that an address from the list may be inserted into the source address field of a frame before the frame is transmitted onto the ring, and the second purpose being that addresses from the SA list 130 are used for stripping frames from the ring by using the "source address stripping" algorithm.

For frame reception the station may use the DA list 132. The station then compares the address in the DA list 132 with the destination address field of a "detected" frame in order to make a decision as to whether or not the frame is to be "received".

A Medium Access Control entity, or MAC entity, uses control frames to control network operation. Control frames include Beacon frames, Claim frames, and other MAC frames. Control frames commonly use only the "individual address" assigned to the MAC entity for comparison with the source address field of a frame. This "individual address" is the "individual address" assigned to the station using the present terminology of one "individual address" per "station". This individual address should be unique. In contrast, frames which are used to send and receive information for clients of the MAC sublayer may use the "individual address", or additionally may use an address in the station SA list 130 for sending and stripping, or may use the station DA list 132 for receiving.

For example, for the stations of bridge 120 the SA list and DA list are shown in FIG. 4A–FIG. 4D. Station SL 122 has both an SA list 140 of alias addresses shown in FIG. 4A, and a DA list 142 of alias addresses shown in FIG. 4B. Also, station SR 124 of bridge 120 has an SA list 150 of alias addresses shown in FIG. 4C, and a DA list 152 of alias addresses shown in FIG. 4D.

Figure 4A:
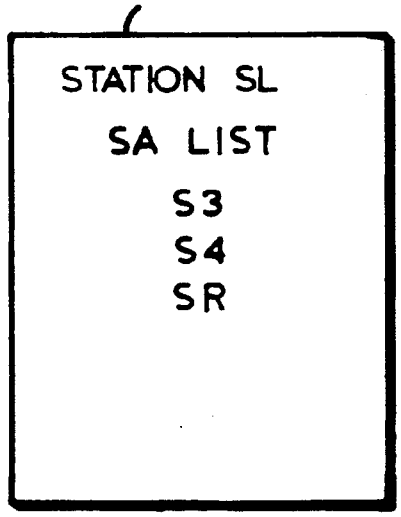
FIGS. 4A, 4B, 4C and 4D show source address lists and destination address lists for a bridge, in accordance with the invention.
Figure 4B:
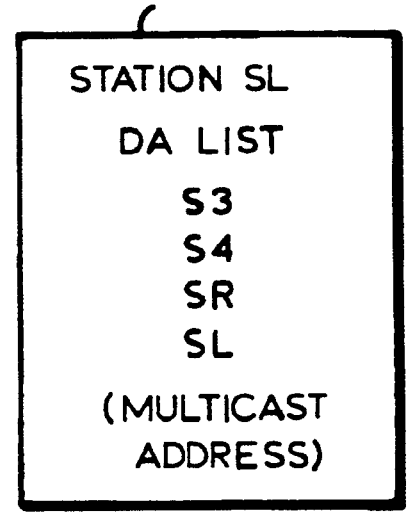
Figure 4C:
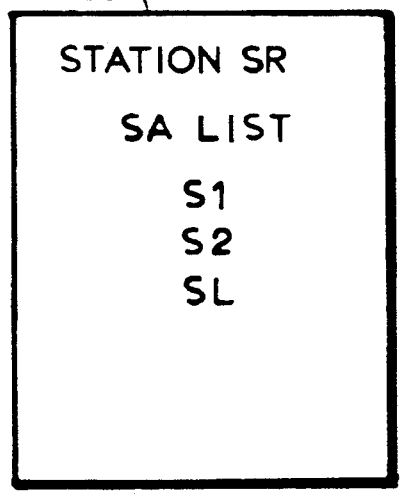
Figure 4D:
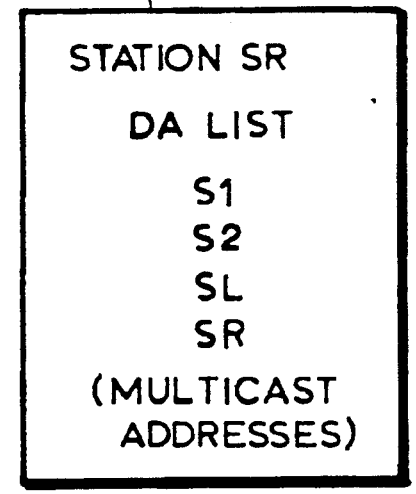

Station SL 122 of bridge 120 uses its destination address list, DA list 142 shown in FIG. 4B, to receive frames originating in ring 100 and destined for a station on ring 110. Station SR 124 of bridge 120 uses its source address list, SA list 150, for stripping frames on ring 110 where the frames originated from ring 100. Accordingly, DA list 142 of station SL 122 has entries of addresses of stations S3, S4, and SR. Also, station SR 124 has entries in SA list 150 shown in FIG. 4C of addresses of stations S1, S2 and SL, so that SR can strip from ring 110 frames originated by stations S1, S2, and SL.

For example, entries which can occur in a destination address list, DA list 132, but not in the corresponding source address list, SA list 130, of a particular station include, for example, the "individual address" of the station and multicast addresses.

A multicast address is an address that causes a plurality of stations to receive the frame. The specialized multicast address is not used for stripping purposes.

A second example of entries which may be included in a destination address list but not in a source address list include addresses for a monitor station. In a monitor station, address of stations to be monitored may be included in the destination address list so that the monitor station will receive all frames addressed to a particular station, or group of stations, for the purpose of monitoring traffic on the network.

Likewise, a message sent from a station on ring 110, say station S3, to station S1 is forwarded by station SR 124 of bridge 120, and the DA list 152 of station SR has addresses of stations S1, S2, and SL as entries. Also, station SL 122 must strip from ring 100 those messages forwarded from ring 110, and so SA list 140 of station SL 122 has as entries addresses of stations S3, S4, and SR, as shown in FIG. 4A.

As in the above example, destination address list DA list 152 of station SR 124 has multicast address as entries for broadcast of messages to ring 100 by forwarding of bridge 120. However the corresponding source address list SA list 150 of station SR 124 does not contain entries for the multicast addresses because these addresses are not used for source addresses. Because these addresses are not used as source addresses, they are not used for source address stripping. That is, the source address list of station SR 124, SA list 150, does not contain the multicast addresses contained in station SR destination address list 152.

A variety of different types of stations may employ alias addresses, either in a source address list or in a destination address list. Typical examples of such stations include: bridges, monitor stations, stations having more than one protocol stack, stations having various addresses for network control functions, etc.

Figure 5A:
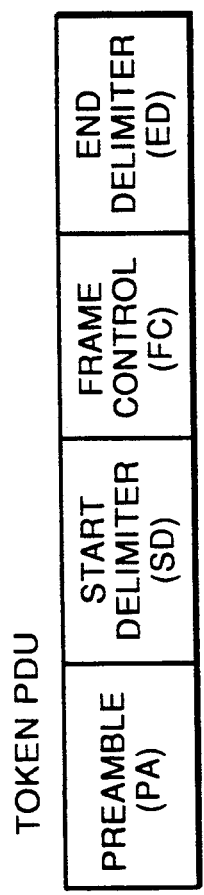
FIG. 5A and FIG. 5B show frame format in accordance with the FDDI standard.
Figure 5B:
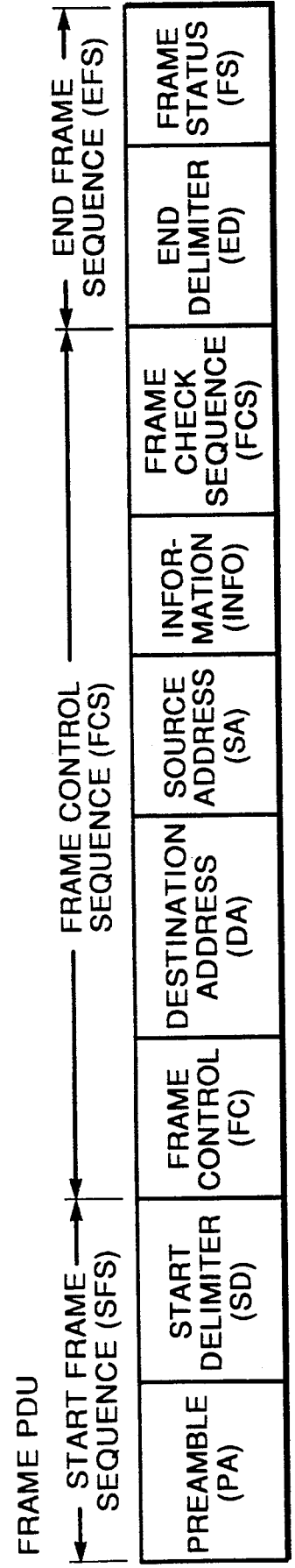

Two types of "protocol data units" are used by the FDDI MAC layer, tokens as shown in FIG. 5A, and frames as shown in FIG. 5B. The token, as shown in FIG. 5A, has first a preamble PA of 16 or more symbols, followed by a starting delimiter SD of 2 symbols, followed by a frame control FC sequence indicating that the "protocol data unit" is a token, and finally an ending delimiter ED of 2 symbols. In the event that frame control field FC indicates that the incoming "protocol data unit" is not a token, then the "protocol data unit" is a frame as shown in FIG. 5B.

The frame control field FC is a string of bits, and for example, in a system designed according to the FDDI protocol is 8 bits. One combination of the FC bits indicates that the "protocol data unit" is a beacon frame, another set of bits indicates that it is a claim frame, another set of bits indicates that it is another MAC protocol frame, another set of bits indicates that it is an information frame, etc.

When a station, in accordance with the invention, creates a beacon frame or a claim frame or other MAC protocol frame the station always inserts the station's "my address" MA into the source address field SA of the frame. That is, a station never creates a beacon frame or a claim frame or other MAC protocol frame with an address taken from the source address list SA list 130.

Most ring protocols have the requirement that neither beacon frames nor claim frames or other MAC protocol frame are forwarded by any type of station from the ring where they are created. For example, The FDDI protocol has this requirement. The preferred embodiment of the invention has this requirement that neither beacon nor claim frames nor other MAC protocol frames are forwarded by any type of station from the ring where they were created.

Since no beacon frame or claim frame or other MAC protocol frame is forwarded to another ring, there should be no match between the source address of a beacon frame or claim frame or other MAC protocol frame and any entry in a source address list SA 130. A match between the source address SA of a beacon frame or a claim frame or other MAC protocol frame and an entry in the source address list SA list 130 of a station indicates a duplicate address problem.

Stated differently, since: (1) the source address list, SA list 130, of a station contains source addresses, both from other rings and from other various sources, for the purpose of stripping frames having source addresses matching those stored in the SA list 130; (2) no station puts an entry from its source address list SA 130 in a beacon or claim frame or other MAC protocol frame as the source address SA of the frame; (3) no beacon or claim frame or other MAC protocol frame is forwarded from the ring in which it is created; therefore, the occurrence of a match between an entry in the source address list, SA list 130, and the source address of a beacon or claim frame or other MAC protocol frame is a positive indication that a duplicate address exists in the ring.

Figure 6:
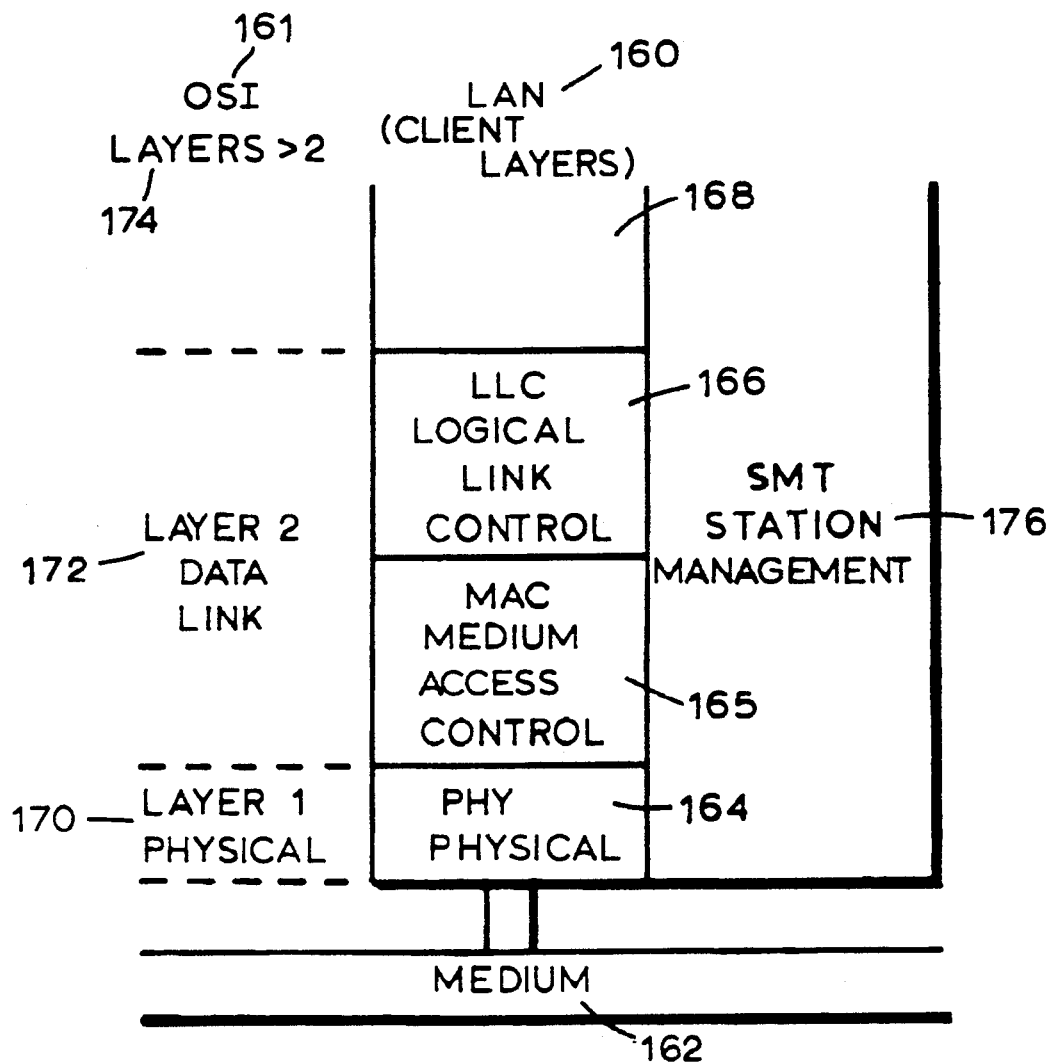
FIG. 6 shows the correspondence between the OSI seven layer communications model and a LAN communications model in accordance with the invention.

For orientation purposes, FIG. 6 is a block diagram comparing the architecture of a local area network architecture 160 with the Open Systems Interconnect, OSI, seven (7) layer communications model 161. The communications medium 162 either delivers bits to the physical layer 164 or receives bits for transmission from the physical layer. The physical layer 164 either delivers bits to the Medium Access Control, MAC, layer 165 or receives bits from the MAC layer 164. Also, the MAC layer either receives data from the logical link layer, LLC, 166 or delivers data to the LLC 166. The LLC 166 layer delivers data to higher client layers of the architecture, or receives information from the higher client layers for transmission.

In the OSI seven (7) level reference model 161, Layer 1, the physical layer 170 corresponds to the LAN physical layer 164. The OSI layer 2, the data link layer 172 corresponds to the LAN architecture 160 levels designated as MAC 165 and LLC 166. The higher levels 174, above level 2, correspond to the LAN client levels 168.

For the present invention, the logical link layer, LLC, need not be further specified. For example, the layered model provides for modular design. And the higher layers are designed independently of the particular details of the lower layer. Many higher protocol layers, such as the LLC layer or higher, may be used with and benefit from the invention.

The station management 176, SMT, entities interact with various levels of the LAN architecture 160, including the PHY 164, the MAC 165, the LLC 166, and the higher client layers 168. The network management entities perform services and request services as needed to maintain and manage the data link layer.

Figure 7:
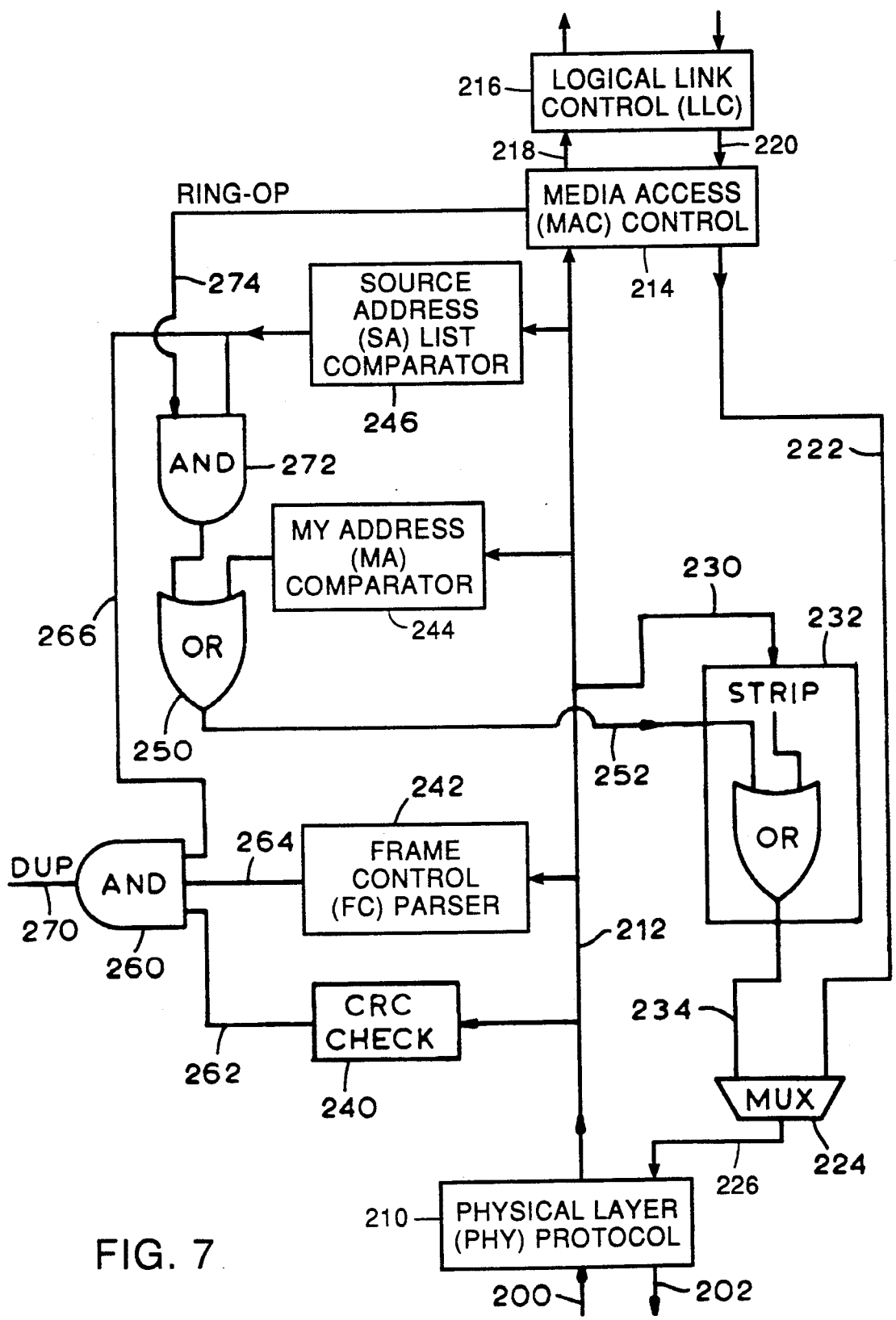
FIG. 7 is a block diagram of an implementation of the invention in a station of a LAN.

FIG. 7 is a block diagram showing the control flow for an implementation in a station using the invention to detect the presence of a duplicate alias address. Line 200 is the input line from the ring (not shown), and line 202 is the output line from the station to the ring. A frame enters the station as a stream of bits on line 200. The stream of bits is converted by the physical layer, PHY 170, 164 of FIG. 6, into an information stream. The information stream is conveniently processes internally by the station. The bit stream first enters the physical protocol apparatus, box 210. The information stream leaves the physical protocol apparatus along line 212, and the information stream is conducted to the MAC control apparatus 214 by line 212. The information stream is delivered to the logical link layer LLC 216 by line 218.

The invention is modeled within the MAC sublayer and modifies the operation of certain MAC functions related to processing of frames and source addresses. FIG. 7 details the control flow required for the invention. The timing of the various control signals is not discussed as there are many possible detailed designs. For instance, the events which cause various signals to occur and the actions which result are specified, but the circuitry for causing the signals to coincide in time or act at the correct time is not detailed. Functions necessary for operation of a PLAC for a token ring but which are independent of the invention are included in MAC control 214. For FDDI MAC, the functions 214 include detection of a lost token, control of ring initialization, and transmission of PDU's based on the token protocol. The processing of the DA within a frame is also included in 214. The DA processing is modeled to operate based on a DA address list separate from SA addresses. In practice, hardware for storage of DA and SA addresses may sometimes be shared without changing the spirit of the invention.

A frame coming from logical link layer LLC 216 is conducted as an information stream along line 220 to the MAC control apparatus 214. From the MAC control apparatus 214 the information stream is conducted by line 222 to MUX 224, and from MUX 224 the information stream is conducted by line 226 to the physical control apparatus 210. MUX 224 is a multiplexer having the function of either conducting the signal on line 234 to line 226, or conducting the signal on line 222 to line 226. In the event that a frame is being repeated onto the ring, MUX 224 conducts the signal from line 234 to line 226. In the event that the station is transmitting a frame onto the ring, MUX 224 conducts the signal on line 222 to line 226. The MUX 224 is controlled (control line not shown) by MAC control 214.

The physical control apparatus 210 converts the information stream from line 226 into a stream of bits, and the stream of bits is transmitted onto the ring (not shown in FIG. 7) by line 202.

An incoming information stream is automatically repeated on the ring by being conducted by line 230, first to repeat inhibit block 232, and if the repeat function is not inhibited by repeat inhibit block 232, the information stream is conducted by line 234 to MUX 224 for transmission onto the ring through line 202.

Various functional blocks "listen" to the incoming information stream on line 212, and these functional blocks include: the cyclical redundancy check, CRC check block 240; the frame control field parser FC parser block 242; the "my address" comparator which compares the source address field SA of the incoming frame with the station "my address" MA, MA comparator 244; and, source address list comparator, SA comparator 246, which compares the SA list 130 addresses with the source address of the incoming frame.

Frame stripping is accomplished by OR circuit 250 inhibiting repeat inhibit block 232 using line 252 in the event that either SA-MA comparator 244 or alias comparator 246 signals a match with the source address of the incoming frame.

A duplicate alias address is detected by AND circuit 260 in the event that input line 262 from CRC check 240 indicates that the information stream is error free on line 212; that input line 264 from FC parser 242 indicates that the frame is either a beacon frame or a claim frame or other MAC protocol frame; and input line 266 indicates a match between the source address of the incoming frame and an alias address stored in the source address alias address list of the station by SA list comparator 246. AND circuit 260 drives line 270 to indicate that a duplicate address has been found when the three inputs lines, 262, 264, and 266 all indicate true for the same frame.

Requiring the assertion of line 270, that a duplicate address problem has been found, to depend on the result of CRC checker 240 indicating that the information stream on line 212 is without error is a quality requirement that reduces false indications of a duplicate address problem.

Once line 270 has been asserted to indicate that a duplicate alias source address has been found corrective action is taken. For example, the processor serving the MAC layer can be interrupted and software executed in order to identify the duplicate address. Once the duplicate address is identified, further corrective action may be taken. The corrective action may be to inform the network management, remove the duplicate address from the alias address list of the station, and to possibly remove the two stations station having the duplicate address from the network by use of a network management protocol, or other corrective action as appropriate.

Once the duplicate address is identified by the assertion of line 270, the time period for the corrective action to take effect may be critical to the rest of the ring. For example, until the corrective action takes effect the ring may experience the Beacon/Claim oscillation as described in the Appendix.

A method to alleviate the duplicate address problem is provided by AND gate 272 in FIG. 7. One of the inputs to the AND gate 272 is the Ring_Op signal 274 from MAC control 214. Ring_Op signal 274 indicates when asserted high that the ring is operational, and when asserted low that the ring is not operational. The other input to the AND gate 272 is the output of SA list comparator 246. In the event that the ring is operational, that is the Ring_Op signal 274 is asserted high then a match of an address in the SA list by SA list comparator 246, with the source address field of the received frame will cause the frame to be stripped as it should be.

However, if the Ring_Op signal 274 is not asserted high, then AND gate 272 disables stripping of frames from the ring, where the stripping is based on a match in the SA list comparison by SA list comparator 246. Disabling stripping allows the station to repeat Beacon, Claim, or other MAC protocol frames even when the source address field of the frame matches an address in the SA list of SA list comparator 246. Disabling this stripping allows ring initialization to make progress.

Concurrently, while these frames are being repeated, the AND gate 260 detects the duplicate address problem. Accordingly, AND gate 272 allows the ring to become operational when an address in the SA list 246 is a duplicate address. The use and function of AND gate 272 is independent of duplicate address detection by AND gate 260 and indication by line 270.

A convenient implementation of alias comparator 246 is a "content addressable memory", referred to by those skilled in the art as a CAM. A content addressable memory has the property that an address is asserted on a set of input lines to the CAM, and if that address is stored as a number in the CAM memory, an output on a match line is asserted true.

Figure 8:
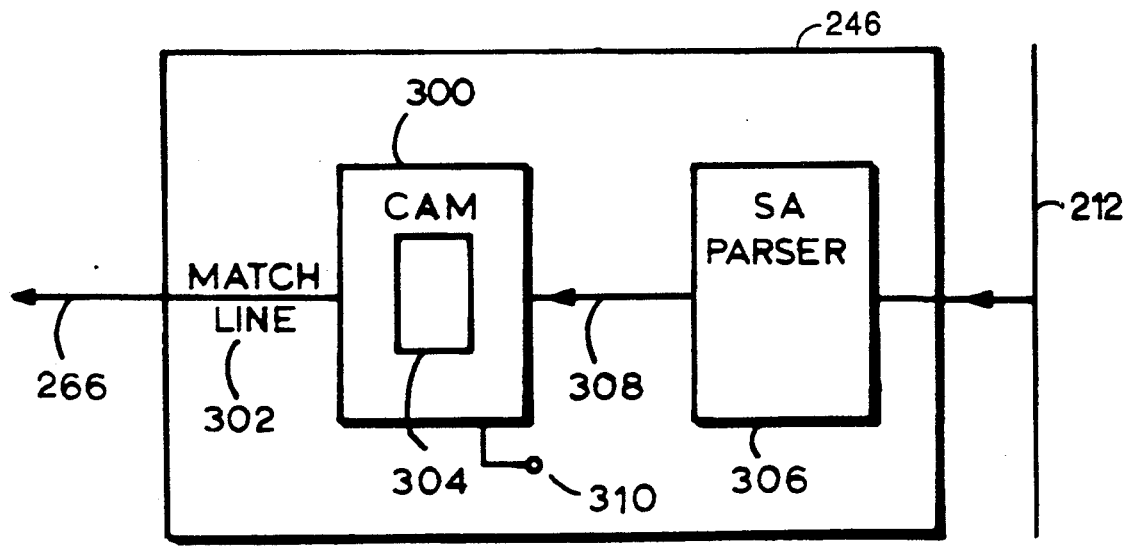
FIG. 8 is a block diagram of an alias comparator using a CAM, in accordance with the invention.

Referring to FIG. 8 and to FIG. 7, in using a CAM 300, in alias comparator 246, the match line 302 of the CAM is used as output line 266. The list of alias addresses is stored in the CAM memory 304. The SA of the incoming frame is delivered from line 212 to alias comparator 246 where the source address SA is read by SA parser 306. SA parser 306 delivers the source address SA of the incoming frame to the CAM input lines 308. If the SA of the incoming frame is stored in the memory 304 of CAM 300, then the match line 302 is asserted true and the true signal appears on output line 266, indicating that an alias address matches the SA of the incoming frame. In the event that FC parser 242 indicates that the frame is a beacon frame or a claim frame or other MAC frame and that CRC check 240 indicates that the information stream is good, then a duplicate alias address problem exists, and AND circuit 260 asserts a true on its output line 270.

Use of the logic circuits with the source address list stored in a CAM allows the duplicate address test to be completed in only one memory cycle time of the CAM. This rapid test is a great improvement over running an execution of the RMT protocol for each address in the source address list of a station.

The function of AND gate 272 is to inhibit stripping of beacon, claim, or other MAC protocol frames in the event that the source address field of the frame matches an address in the source address list, SA list, of the station. The use of AND gate 272 is one embodiment of the principle of inhibiting stripping when the source address field of a beacon frame, claim frame, or other MAC control protocol frame matches an address in the station SA list. Those skilled in the art will recognize that there are many equivalent methods for inhibiting stripping when a beacon frame, claim frame, or other MAC protocol frame has an address match with the SA list of the station without departing from the spirit and scope of the invention.

For example a second embodiment of the invention disables the content addressable memory, CAM, when a CAM is used to store the station SA list. In the event that the station SA list is maintained in a CAM, as shown in FIG. 8, then the CAM may be disabled and so prevent the output from SA list comparator 246 from being asserted. Many CAM chips have a "disable" pin, and so disable pin 310 shown in FIG. 8 may be used to practice the present invention.

Figure 9:
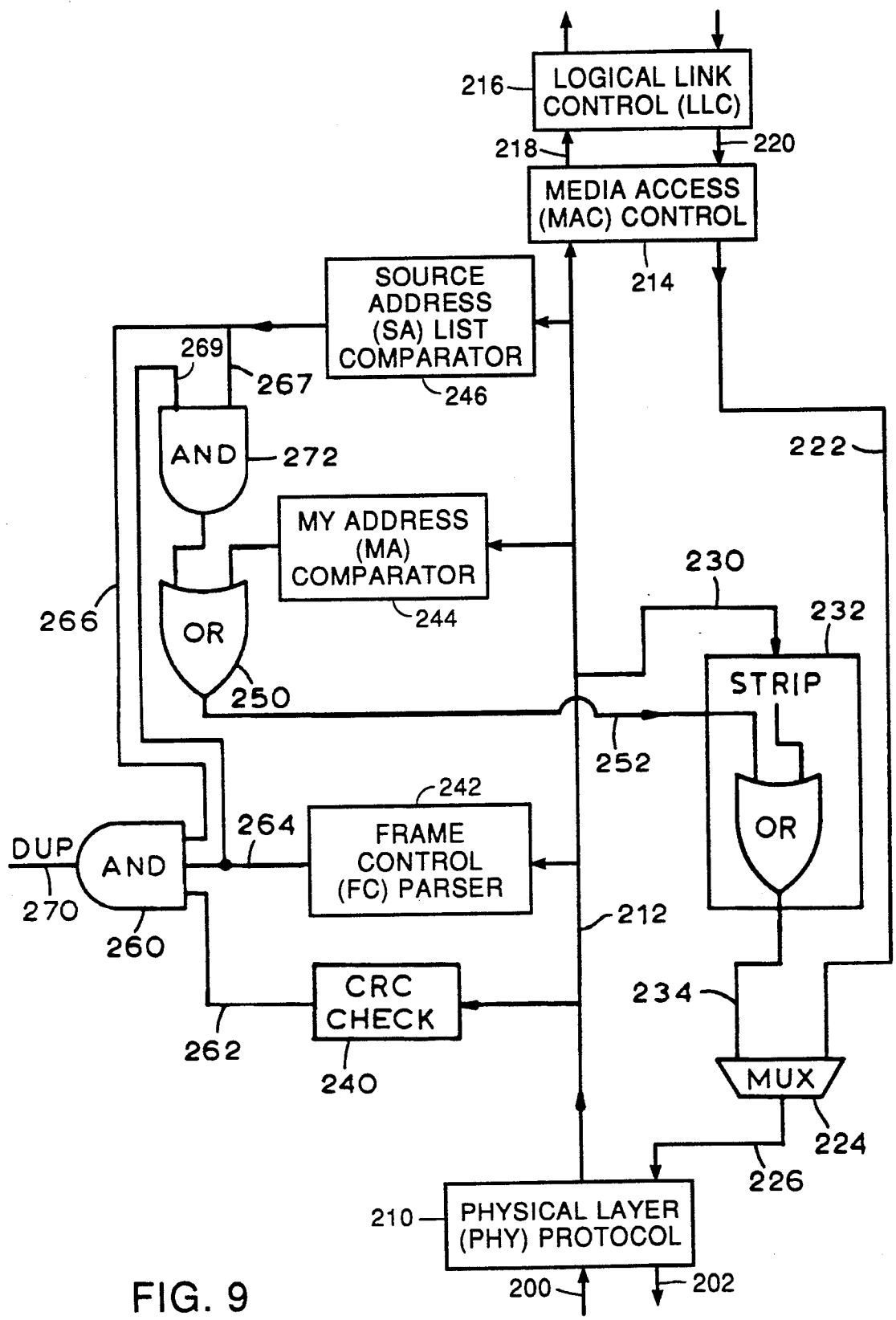
FIG. 9 is a block diagram of an alternative embodiment of the invention.

As a further example, a third embodiment of the principle of inhibiting stripping when the frame having a match between its source address field and the SA list of the station is a beacon frame, or claim frame, or other MAC protocol frame is show in FIG. 9. The output of FC parser line 264 connects to input 269 of AND gate 272. The signal on line 264, and therefore input 269 of AND gate 272, is asserted high in the event that FC parser 242 detects a beacon frame, a claim frame, or another MAC protocol frame. The detection of the presence of a beacon frame, a claim frame, or another MAC protocol frame is equivalent to the Ring_Op signal on line 274 of FIG. 7 indicating that the ring is not operational, and in some embodiments of the invention the output of FC parser 242 may be used to establish the value of the Ring_Op signal on line 274. Line 269 provides the signal to prevent stripping of beacon frames, claim frames, or other MAC Control frames.

While the invention has been particularly shown and described with reference to the particular embodiments described hereinabove, it will be understood by those skilled in the art that various changes in form and details may be made therein without departing from the spirit and scope of the invention.

APPENDIX

Computer Networks

A network of computers using a shared channel for exchange of frames between stations of the network must have some means for deciding which station has access to transmit a frame onto the medium. A ring network has segments of media of the shared channel connecting the stations into the ring.

One method to control access to the media is to connect the stations in a logical ring, and to use a token passing protocol to control access to transmit frames on the media. The media, the connection into a logical ring, and the stations connected to the media are referred to as the "ring". An example of a well known token passing protocol is: to have a token, the token is held by a station, and the station holding the token is granted access to transmit on the ring, and after transmitting a last frame on the ring the station passes the token to the next station, and so the token passes around the ring. Also, it is common to require a station transmitting onto the ring to remove, or "strip", from the ring the frames that it transmitted.

The FDDI communications network uses source address stripping. The FDDI network is described in a number of documents produced by the American National Standards Institute (hereinafter ANSI), including: (1), "FDDI Station Management," ANSI/IEEE X3T9/90-078, X3T9.5/84-49, Rev. 6.2, May 18, 1990; (2), "Fiber Distributed Data Interface (FDDI)—Token Ring Media Access Control (MAC)", ANSI/IEEE X3.139-1987; (3), and the physical layer specification is discussed in "ANSI/IEEE standard ANSI X3.148-1988". The FDDI network is a ring topology and the right to transmit is controlled by a token. Capture of the token by a station permits the station to transmit.

Source address stripping used by the FDDI communications network makes use of the source address field SA in a frame. Stripping of frames from the ring proceeds by having each station check all frees detected on the ring, and for each station to strip those frames having the source address field of the frame, SA, correspond to the individual address of the station.

Source address stripping works well so long as each station has a unique address. In the event that two stations have the same address, the "duplicate address problem", then source address stripping may lead to operational problems with the ring.

Station Addresses

A key feature of Local Area Networks, LAN, and Wide Area Networks, WAN, communications networks is that each station on the network has at least one unique address, and may have several unique addresses. Problems arise in the network when an address which should be unique is in fact duplicated in two or more stations. The address is normally used in a MAC layer, of the seven layer ISO communications model, in order to provide an address function of the station.

Various well known LAN communications networks are expected to work together through bridges, etc, and so must have unique station addresses, and include: the IEEE 802 family of protocols, including IEEE 802.3 ETHERNET also known as Carrier Sense Multiple Access/Collision Detect CSMA/CD, IEEE 802.4 Token Bus, and IEEE 802.5 Token Ring; the Fiber Distributed Data Interface FDDI token ring, etc.

Administration of the addresses assignment is partly handled by the Institute of Electrical and Electronic Engineers (hereinafter IEEE), New York, N.Y. The address space may, for example, be a 48 bit address space. The address space may be broken into sub-address spaces. For example, administration of the addresses is broken into two 47 bit address spaces, a Globally Unique address space and a Locally Administered address space. Each address space has $2^{**}47$ addresses. Other sub-address spaces may be defined, for example, there may be an individual station address space and a group address space wherein groups of stations may be identified.

The IEEE handles administration of the Globally Unique address space. The IEEE assigns blocks of addresses to each manufacturer of equipment. The manufacturer then is responsible for assigning a unique individual address from its assigned block of addresses into each station that is manufactured. Each manufacturer then provides a means for the station to "know" its address whenever the station is active on the network. And this means usually provides an automatic assignment of the address to the MAC layer of the station in order to minimize errors in the 48 bit address.

The stations interconnected into networks may be made by many different manufacturers. Conceptually, all stations ever manufactured, by all different manufacturers, must be capable of operating on one communications network. This concept is necessary because it is never known which subset of stations will be connected into a particular combination of local area networks and wide area networks. The administration of the Globally Unique address space addresses by the IEEE assigns unique blocks to equipment manufacturers. Equipment manufacturers insure that each new manufactured station will have a unique address taken from that block so that global interconnection is possible. Also the administration of the Locally Administered address space by network users, managers or owners is also supposed to insure unique addresses.

The Locally Administered address space is managed by either users or address administrators for various networks, organizations, etc. Addresses from the Locally Administered address space are typically handled manually and so are prone to human error.

A frame contains a destination address field DA which identifies the intended receiver station of the frame, or receivers when a group destination address is specified. Also, the frame contains a source address field SA which identifies the transmitter station of the frame.

The source address SA and destination address DA of a frame are detected by a station, and are used by the station for a variety of purposes. The most basic purpose of DA is for detecting frames addressed to the station. The source addresses SA may be used for other purposes such as source address stripping. Additionally, a station may use a frame, including the source address of the frame in ring recovery and initialization protocols. Also, a station may utilize a plurality of addresses for a variety of purposes. Examples of the use of a plurality addresses include: separate addresses for different protocol stacks in a station; as a forwarding list in a bridge; and, by a station for network management purposes, etc.

Address Detection

A content addressable memory (CAM) may be used for rapid comparison the source addresses in a frame with a list of addresses in a station. For example, a bridge station on a FDDI ring network must forward frames addressed to a station on an interconnected LAN, and such a station may use a CAM to aid comparison of a source address, SA, in a frame with addresses maintained in the bridge station address list.

FDDI Normal Ring Recovery and Initialization

A station begins a ring recovery and initialization process as a result of, for example, some ring disruption, timeout of a timer, etc.

A station begins a ring recovery and initialization process by first entering a claim process by transmitting claim frames. In the event that the claim process fails, the station begins beaconing. Upon successful completion of beaconing, the station again enters the claim process.

Ring recovery normally proceeds as follows:

A. A station which is beaconing continues to do so until:
 1. it receives another station's beacon frame, at which time it repeats the other beacon;
 2. it receives its own beacon, at which time it begins to emit claim frames.

B. A station emits claim frames until:
 1. it receives a beacon frame from another station, at which time it repeats the beacon;
 2. it receives a claim frame from another station, and then it either continues to emit its own claim frame or begins repeating the other station's claim frame, according to a set of rules;

C. a station quits claiming when it:
 1. times out and then begins beaconing;

2. receives a claim frame with precedence, according to the rules, and then begins repeating the claim frame with precedence;
3. receives its own claim frame, at which time the station makes a token.

A simple set of rules for determining whether a station, upon receiving a claim frame, either copies the received claim frame or emits it's own claim frame is, for example, to determine precedence on the basis of the numerical value of the station address. For example, in token ring networks, it is a common practice for the claim frame having the source address SA field having the largest value to have precedence. And so the receiving station copies the received claim frame if the SA field of the received frame is larger than the address of the station, and if the SA field of the received frame is smaller than the station address then the station emits its own claim frame. This simple rule, leads in normal operation, to the single station having the largest value of address to make the token.

The FDDI token ring uses an additional layer of rules in determining precedence by requiring that the stations bid for a timer value. And in the event that there is a tie in bidding for the timer value, the conflict is resolved by the value of the station address.

Duplicate Addresses

It is possible, and almost inevitable, that mistakes in address assignment will be made as many tens of thousands of stations are interconnected. Somewhere someone will enter a wrong address into a station, and two stations will have the same address. For example, an address may be 48 bits long, making (2**48) or 2.8*(10**14) possible addresses. If a worker enters a 1 or a 0 wrong in the 48 bit string in loading an address, then two stations may have the same address. And all approximately 2.8*(10**14) addresses must be capable of operating on one FDDI network because it is unknown what subset will actually be connected into any particular network. A very severe address quality control problem exists in the Locally Administered Address assignments, because manual entry of the bits of the address is common.

An even further complication arises because a station may utilize a list of addresses. A particular example is a bridge. A bridge may, for example, join a first FDDI ring with a second FDDI ring. The bridge is specific equipment having a first station on the first ring and a second station on the second ring. The bridge must have a list of addresses listing the stations to which the bridge forwards frames. For example, the bridge first station on the first ring must have a list of addresses of all stations on the second ring so that it forwards frames on the first ring onto the second ring. Likewise, the second station of the bridge on the second ring must have an address list listing all stations on the first ring so that it can forward frames from the second ring onto the first ring. Also, a bridge may connect an FDDI ring with, for example, an ETHERNET network, or a token bus network, or a IEEE 802.5 token ring network, and also must buffer these incompatible protocols.

Ring Disruption by Duplicate Addresses

Severe disruption of the FDDI communications network may occur when two stations have the same address, or a duplicate address occurs in an address list. The disruption occurs because each station uses the source address, SA, in a frame to take action. Actions taken by a station, based on the source address in a frame matching an address in an address list includes, for example, stripping of the frame, and ring recovery and initialization protocol steps.

A station, in doing source address stripping, strips all frames having the source address, SA, of the frame matching any address in the station, including all addresses in the address list of the station.

A possible outcome is that a non-duplicate station may complete the beacon and claim process.

In the Beaconing step each station tests the continuity of the ring by emitting a "Beacon" frame, and then stripping its "own" frame off the ring. The station identifies its "own" frame by reading the source address SA in the frame header. And if two stations have the same address then one will strip the other's Beacon frames from the ring, thereby interfering with the initialization process. Also, if a station has an address list containing a duplicate address, and the list is used for source address stripping, it will strip the other station's beacon frames from the ring.

However, the "Beacon" process may complete with two stations having duplicate addresses by the two stations stripping each other's Beacon frame and not detecting the duplicate address situation.

After a station removes it's "own" Beacon frame, the station begins the "Claim" process in order to determine which station issues the first token. The Claim process proceeds by each station issuing a "Claim" frame and reading all other Claim frames from the other stations, as set forth hereinabove.

The ring can fail to recover and initialize as a result of a duplicate address.

An example of a ring failing to recover and initialize as a result of a duplicate address situation is given as follows: two stations have the same address; one, the first station, of the stations begins beaconing while the second station begins claiming; the second station receives its "own" beacon frame from the first station, and continues claiming; the first station receives the claim frame from the second station, ignores the claim frame since it is beaconing, and continues to emit beacon frames; the second station again receives its "own" beacon frame from the first station, continues to claim, and the network is stuck and no token can be made. This condition is called "Claim Beacon Deadlock". Claim beacon deadlock can also occur if one station has the address of another station in an address list.

The rules for claim frame precedence for the FDDI/ANSI standard ring are more complex than the above example, and are as follows. Each Claim frame has two operative parts, a first part called "Target Token Rotation Time Bid" (hereinafter TTRT_Bid), and a second part consisting of the station address. The TTRT_Bid is a value given to the MAC layer by higher layers, and is a value that the higher layers have determined would be a useful value for that particular station considering its intended application.

In arbitrating for the right to issue a first token, the station bidding the smallest value of TTRT_Bid wins the right to issue the first token, and all stations have their Token Rotation Timers (hereinafter TRT) set to the winning TTRT_Bid value. The Token Rotatation Timer value TRT determines the maximum length of time that a station may hold a token during transmission.

In the event that two stations bid the same value of TTRT_Bid, the bidding is decided on the basis of the length of the address and then on the basis of the value of the address. Winning of the arbitration for the right to issue the first token is determined by the following three rules:
1. The bid with the lowest Target Token Rotation Time (TTRT_Bid) has precedence (i.e. the numerically lowest bid value for TTRT.
2. Given equal TTRT_Bid values in bidding, the bid with the largest address has precedence, (that is, a station with a 48 bit address wins over a station with a 16 bit address);
3. Given equal bid values for TTRT_Bid and equal address lengths, the bid with the highest address has precedence (i.e., the numerically highest address).

The commonly used bidding protocol in the claim process is on the basis of the value of the station address. Although in FDDI the stations bid for TTRT_Bid in order to determine which station will issue the first token, in many other token controlled communications networks the value of TRT is fixed and the bidding for the station to create the first token is based entirely on the value of the station address.

The duplicate address problem in the FDDI network is particularly severe when the winning bid in the Claim process is by two stations having numerically identical addresses. If the two duplicates have bid different values for TTRT, one duplicate will have the winning bid value of TTRT. Each station strips the other's Claim frames. The station with the winning TTRT will never receive its Claim frames containing its own bid TTRT value, and so a token will never be issued. Thus, the FDDI Ring will never become operational.

In addition to the duplicate address problem being introduced by two stations on the ring having the same address, a station may maintain a list of addresses, as described hereinabove. Accordingly, if an address in the address list is numerically the same as any address of a station in the FDDI network, or in an list in any second station on the FDDI network, then the FDDI network may fail to initialize to stable operation as described above. With the interconnection of computer networks having addresses of, for example 48 bits in length, tens of thousands of stations may be connected together. And if any two of these stations has the same address, then the FDDI network may fail to function.

Solutions to Duplicate Address Problem

Four conditions that are indicative of the existence of a duplicate address problem are:
1. A first station receiving its "own" Beacon while Claiming for longer than the maximum delay of the FDDI ring. This condition indicates that another duplicate is Beaconing and the first station is Claiming.
2. A first station receiving it's own Claim frame while Beaconing for longer than maximum delay of the FDDI ring. This condition indicates that another duplicate is Claiming while the station is Beaconing.
3. A first station Receiving it's own Claim frame while not Claiming. This condition indicates that both duplicates have the same winning bid of Target Token Rotation Time (TTRT) and address combination. The first station has stopped Claiming and issued a token, while the other duplicate station continues to Claim.
4. A first station receiving valid Claim Frames with it's "own" address and different bid value for TTRT. This condition indicates duplicates with different TTRT values are both Claiming.

These four conditions in the duplicate address problem have been addressed in the publication "FDDI Ring Management", K. B. Ocheltree and R. F. Montalvo, at the IEEE 14'th conference on Local Computer Networks, October 1989 in Minneapolis, Minn.; and in the document "Research Report, FDDI Duplicate Address Problems", by K. B. Ocheltree, IBM Research Division, Yorktown Heights, N.Y., (no publication date).

These four conditions are included in "FDDI Station Management SMT" Rev. 6.2 mentioned hereinabove as a standard Ring Management Technique (hereinafter RMT). An examination of these conditions shows that they require a protocol to carry out the test steps in Beacon or Claim frame passing through a station, where the protocol is performed by software or specialty hardware.

A further point is that RMT requires that a station "receive" a frame as well as simply "detect" the frame. The claim frames may arrive at a station with insufficient time separation for the station to receive all claim frames. Accordingly, only a sample of claim frames may be received. Therefore, the RMT protocol can only respond to steady state ring conditions, and may miss transient conditions.

The implementation of RMT, as set out in the ANSI standards for FDDI referenced hereinabove, involves comparing many received Claim and Beacon frames to the frames sourced by this MAC. Three steps are necessary before the conditions may be applied. It will be readily apparent how to perform these steps, to a person skilled in the art of the FDDI specifications as hereinabove referenced. First, the state of the MAC transmitter is ascertained, including the SA of a transmitted frame, information contained in transmitted frames, and whether MAC is sending claim frames, beacon frames, or repeating frames from another station. Second, several of the received frames are stored in memory. A special mode of operation is briefly enabled to receive Claim or Beacon frames, as Claim or Beacon frames are not normally received. Third, the state of MAC is verified to have been constant for the sample of frames. If so, the four detection conditions are applied to the MAC transmitter state and received frame contents. The SA in each received frame is compared to the list of addresses used (and therefore stripped) by this station. If a match is found, the transmitter state is used to determine if the frame was transmitted by this station. A duplicate address problem is detected when the SA of the received frame matches the list of addresses but was not recently transmitted. A single such frame is ignored as it may have been created by errors on the media, but many such frames indicate a duplicate address condition has been detected by the RMT process. The above process must be repeated often enough to meet the reaction time specified for RMT, roughly 80 milliseconds.

These four conditions are difficult to implement in a station having an address list containing thousands of addresses. One difficulty is that the protocol, software or hardware, must make the required tests with all addresses in the address list on each source address, in a Beacon or Claim frame received by each station. Also in the example in which RMT responds only to ring steady state conditions, the response is inconveniently delayed.

While the invention has been particularly shown and described with reference to the particular embodiments described hereinabove, it will be understood by those skilled in the art that various changes in form and details may be made therein without departing from the spirit and scope of the invention.

What is claimed is:

1. A station of the type for attachment to a communications network, said network capable of maintaining communications among a plurality of stations, comprising:

means for receiving a frame by said station, said frame having a source address field and a frame control field;

means for maintaining an selected individual address of said station;

means for maintaining a source address list of alias addresses of network entities that access said network through said station but are logically distinct therefrom, said source address list not containing said selected individual address;

means for determining that the contents of said source address field in said frame matches at least one alias address in said source address list;

means for determining that said frame control field of said frame has a predetermined contents; and, means, responsive to said source address of said frame matching at least one alias address in said source address list and said frame control field of said frame having said predetermined contents, for setting an indicator that a duplicate address condition exits.

2. The apparatus as in claim 1 wherein said predetermined contents of said frame control field further comprises an indication that said frame is a predetermined type of control frame.

3. The apparatus as in claim 1 wherein said predetermined contents of said frame control field further comprises an indication that said frame is a beacon frame.

4. The apparatus as in claim 1 wherein said predetermined contents of said frame control field further comprises an indication that said frame is a claim frame.

5. The apparatus as in claim 1 wherein said means for maintaining a source address list further comprises:

means for storing said list of alias addresses in a content addressable memory.

6. The apparatus as in claim 1 further comprising:

means for determining that bits from said source address field and bits from said frame control field pass a cyclical redundancy check, CRC; and, means, responsive to said bits passing said cyclical redundancy check, for indicating the detection of a duplicate address condition.

7. The apparatus as in claim 1 further comprising:

means for setting a first signal to a predetermined first value in the event that said contents of said source address field of said frame match an alias address in said source address list;

means for setting a second signal to a predetermined second value in the event that said contents of said frame control field has said predetermined contents;

means for setting a third signal to a predetermined third value in the event that said source address field and said frame control field pas said cyclical redundancy check;

means, responsive to said first signal being at said predetermined first value and said second signal being at said predetermined second value and said third signal being at said predetermined third value, for indicating that a duplicate address condition exists.

8. The apparatus as in claim 7 wherein said means responsive to said first signal, said second signal and said third signal and for indicating that a duplicate address condition exists is an AND logic means.

9. The apparatus as in claim 8 wherein said AND logic means is an AND circuit.

10. The apparatus as in claim 8 wherein said communications system is a fiber distributed data interface.

11. A station of the type for attachment to a computer communications network, said network capable of maintaining communications among a plurality of stations, comprising:

means for receiving a frame by said station, said frame having a source address field and a frame control field;

means for maintaining a selected individual address of said station;

means for maintaining a source address list of alias addresses of network entities that access said network through said station but are logically distinct therefrom, said source address list not containing said selected individual address;

means for determining that a contents of said source address field in said frame matches at least one alias address in said source address list;

means for determining that said frame control field of said frame has a predetermined contents;

means for determining that bits from said source address field and bits from said frame control field pass a cyclical redundancy check, CRC; and, means, responsive to said source address of said frame matching at least one alias address in said source address list and also responsive to said frame control field of said frame having said predetermined contents and also responsive to bits from said source address field and bits from said frame control field passing said cyclical redundancy check, for setting an indicator that a duplicate address condition exists.

12. A station of the type for attachment to a computer communications network, said network capable of maintaining communications among a plurality of stations, comprising:

means for receiving a frame by said station, said frame having a source address field and a frame control field;

means for maintaining a selected individual address of said station;

a content addressable memory for maintaining a source address list of alias addresses of network entities that access said network through said station but are logically distinct therefrom, said source address list not containing said selected individual address;

means, responsive to said content addressable memory, for setting a first signal to a predetermined first value in the event that said contents of said source address field of said frame match an alias address in said source address list;

means for setting a second signal to a predetermined second value in the event that said contents of said frame control field indicate that said frame is a beacon frame, or is a claim frame, or is another MAC protocol frame;

means for setting a third signal to a predetermined third value in the even that said source address field and said frame control field pass a cyclical redundancy check;

an AND circuit means, responsive to said first signal being at said predetermined first value and said second signal being at said predetermined second value and said third signal being at said predetermined third value, to indicate that a duplicate address condition exists.

13. A method for detecting a duplicate address condition in a station of the type for attachment to a computer communications network, said network capable of maintaining communications among a plurality of stations, comprising:

receiving a frame by said station, said frame having a source address field and a frame control field;

maintaining a selected individual address of said station;

maintaining a source address list of alias addresses of network entities that access said network through said station but are logically distinct therefrom, said source address list not containing said selected individual address;

determining that a contents of said source address field in said frame matches at least one alias address in said source address list;

determining that said frame control field of said frame has a predetermined contents; and setting an indicator that a duplicate address condition exists in response to said source address of said frame matching at least one alias address in said source address list and said frame control field of said frame having said predetermined contents.

14. A method for detecting a duplicate address condition in a station of the type for attachment to a computer communications network, said network capable of maintaining communications among a plurality of stations, comprising:

receiving a frame by said station, said frame having a source address field and a frame control field;

maintaining a selected individual address of said station;

maintaining in a content addressable memory a source address list of alias addresses of network entities that access said network through said station but are logically distinct therefrom, said source address list not containing said selected individual address;

setting a first signal, in response to said content addressable memory, to a predetermined first value in the event that said contents of said source address field of said frame match an alias address in said source address list;

setting a second signal to a predetermined second value in the event that said contents of said frame control field indicate that said frame is a beacon frame, or is a claim frame, or is another MAC protocol frame;

setting a third signal to a predetermined third value in the event that said source address field and said frame control field pass a cyclical redundancy check;

indicating by an AND circuit that a duplicate address condition exists, said AND circuit responsive to said first signal being at said predetermined first value and said second signal being at said predetermined second value and said third signal being at said predetermined third value.

15. A station of the type for attachment to a computer communications network, said network capable of maintaining communications among a plurality of stations, comprising:

means for receiving a frame by said station, said frame having a source address field and a frame control field;

means for maintaining a selected individual address of said station;

means for maintaining a source address list of alias addresses of network entities that access said network through said station but are logically distinct therefrom, said source address list not containing said selected individual address;

means for determining that a contents of said source address field in said frame matches at least one alias address in said source address list;

means for determining whether said network is in an operational state or is in an initialization state;

means, responsive to said contents of said source field of said frame matching at least one alias address in said source address list and responsive to said network being in said operational state, for stripping frames from said network, whereby beacon, claim, and other MAC protocol frames are stripped based on source address match with said source address list; and means, responsive to said network being in said initialization state, for disabling the stripping of frames from said network, whereby beacon, claim, and other MAC protocol frames are not stripped despite a source address match with said source address list.

16. A method of preventing a duplicate address condition from causing stripping of control frames in a station of the type for attachment to a computer communications network, said network capable of maintaining communications among a plurality of stations, comprising:

receiving a frame by said station, said frame having a source address field and a frame control field;

maintaining a selected individual address of said station;

maintaining a source address list of alias addresses of network entities that access said network through said station but are logically distinct therefrom, said source address list not containing said selected individual address;

determining that a contents of said source address field in said frame matches at least one alias address in said source address list;

determining whether said network is in an operational state or is in an initialization state;

stripping frames from said network in response to said contents of said source field of said frame matching at least one alias address in said source address list and in response to said network being in said operational state, whereby beacon, claim, and other MAC protocol frames are stripped based on source address match with said source address list; and disabling the stripping of frames from said network in response to said network being in said initialization state, whereby beacon, claim, and other MAC protocol frames are not stripped despite a source address match with said source address list.

* * * * *